United States Patent
Zhou et al.

(10) Patent No.: US 8,914,969 B1
(45) Date of Patent: Dec. 23, 2014

(54) METHOD FOR PROVIDING A MONOLITHIC SHIELD FOR A MAGNETIC RECORDING TRANSDUCER

(71) Applicant: Western Digital (Fremont), LLC, Fremont, CA (US)

(72) Inventors: Xiaotian Zhou, Fremont, CA (US); Hongzhou Jiang, Fremont, CA (US); Donghong Li, Pleasanton, CA (US); Lien-Chang Wang, Fremont, CA (US); Ching-Huang Lu, Fremont, CA (US); Wencheng Su, Cupertino, CA (US); Lieping Zhong, San Jose, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/717,057

(22) Filed: Dec. 17, 2012

(51) Int. Cl.
  *G11B 5/127* (2006.01)
  *H04R 31/00* (2006.01)
  *G11B 5/31* (2006.01)

(52) U.S. Cl.
  CPC .................. *G11B 5/315* (2013.01)
  USPC ............ 29/603.16; 29/603.11; 29/603.13; 29/603.14; 29/603.15; 29/603.18; 216/22; 216/39; 216/41; 216/46; 216/65; 360/121; 360/122; 360/317

(58) Field of Classification Search
  USPC ........... 29/603.11, 603.13–603.16, 603.18, 29/605, 606; 216/22, 39, 41, 48, 65; 360/121, 122, 317; 451/5, 41
  See application file for complete search history.

(56) References Cited

U.S. PATENT DOCUMENTS

| | | |
|---|---|---|
| 4,843,023 A | 6/1989 | Chiu et al. |
| 5,498,898 A | 3/1996 | Kawamura |
| 5,640,032 A | 6/1997 | Tomioka |
| 5,672,526 A | 9/1997 | Kawamura |
| 5,898,541 A | 4/1999 | Boutaghou et al. |
| 6,297,936 B1 | 10/2001 | Kant et al. |
| 6,489,177 B1 | 12/2002 | Inomoto |
| 6,738,231 B2 | 5/2004 | Arya et al. |
| 6,943,993 B2 | 9/2005 | Chang et al. |
| 6,949,833 B2 | 9/2005 | O'Kane et al. |
| 6,954,340 B2 | 10/2005 | Shukh et al. |
| 6,975,486 B2 | 12/2005 | Chen et al. |
| 6,980,403 B2 | 12/2005 | Hasegawa |
| 7,042,682 B2 | 5/2006 | Hu et al. |
| 7,050,270 B1 | 5/2006 | Oveyssi et al. |
| 7,067,066 B2 | 6/2006 | Sasaki et al. |
| 7,070,698 B2 | 7/2006 | Le |
| 7,075,756 B1 | 7/2006 | Mallary et al. |
| 7,124,498 B2 | 10/2006 | Sato |

(Continued)

*Primary Examiner* — Paul D Kim

(57) ABSTRACT

A method fabricates a magnetic transducer. A sacrificial leading shield is provided on an etch stop layer. A nonmagnetic layer is provided on the sacrificial leading shield. A pole trench is formed in the nonmagnetic layer and on the sacrificial leading shield. A pole is formed. The pole has a bottom and a top wider than the bottom in a pole tip region. Part of the pole in the pole tip region is in the pole trench and at the ABS location. The sacrificial leading shield and part of the nonmagnetic layer adjacent to the pole are removed. An air bridge thus resides in place of the sacrificial leading shield between the portion of the pole and the etch stop layer. As least one shield layer is provided. The at least one shield layer substantially fills the air bridge and form a monolithic shield including a leading and side shields.

9 Claims, 11 Drawing Sheets

(56) References Cited

U.S. PATENT DOCUMENTS

| | | |
|---|---|---|
| 7,193,815 B1 | 3/2007 | Stoev et al. |
| 7,239,479 B2 | 7/2007 | Sasaki et al. |
| 7,295,401 B2 | 11/2007 | Jayasekara et al. |
| 7,322,095 B2 | 1/2008 | Guan et al. |
| 7,337,530 B1 | 3/2008 | Stoev et al. |
| 7,367,112 B2 | 5/2008 | Nix et al. |
| 7,525,769 B2 | 4/2009 | Yao et al. |
| 7,565,732 B2 | 7/2009 | Le et al. |
| 7,576,951 B2 | 8/2009 | Allen et al. |
| 7,684,158 B1 | 3/2010 | Lauer |
| 7,898,773 B2 | 3/2011 | Han et al. |
| 7,978,438 B2 | 7/2011 | Ohta et al. |
| 8,000,059 B2 | 8/2011 | Jiang et al. |
| 8,015,692 B1 | 9/2011 | Zhang et al. |
| 8,051,552 B2 | 11/2011 | Jiang et al. |
| 8,065,787 B2 | 11/2011 | Sasaki et al. |
| 8,066,892 B2 | 11/2011 | Guthrie et al. |
| 8,120,874 B2 | 2/2012 | Hsiao et al. |
| 8,137,570 B2 | 3/2012 | Le |
| 8,149,537 B2 | 4/2012 | Nazarov |
| 8,166,631 B1 | 5/2012 | Tran et al. |
| 8,166,632 B1 | 5/2012 | Zhang et al. |
| 8,201,320 B2 | 6/2012 | Allen et al. |
| 8,201,321 B2 | 6/2012 | Matono et al. |
| 8,231,796 B1 * | 7/2012 | Li et al. .......................... 216/22 |
| 8,300,359 B2 * | 10/2012 | Hirata et al. ............... 360/125.3 |
| 8,451,563 B1 * | 5/2013 | Zhang et al. ............... 360/125.3 |
| 8,576,517 B1 * | 11/2013 | Tran et al. ..................... 360/319 |
| 2002/0071208 A1 | 6/2002 | Batra et al. |
| 2005/0057852 A1 | 3/2005 | Yazawa et al. |
| 2005/0068669 A1 | 3/2005 | Hsu et al. |
| 2005/0128637 A1 | 6/2005 | Johnston et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0115584 A1 | 5/2007 | Balamane et al. |
| 2007/0146929 A1 | 6/2007 | Maruyama et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0211384 A1 | 9/2007 | Hsiao et al. |
| 2007/0217069 A1 | 9/2007 | Okada et al. |
| 2007/0223144 A1 | 9/2007 | Yao et al. |
| 2007/0245545 A1 | 10/2007 | Pentek et al. |
| 2007/0253107 A1 | 11/2007 | Mochizuki et al. |
| 2007/0268626 A1 | 11/2007 | Taguchi et al. |
| 2008/0100959 A1 | 5/2008 | Feldbaum et al. |
| 2008/0110761 A1 | 5/2008 | Lam et al. |
| 2008/0113090 A1 | 5/2008 | Lam et al. |
| 2008/0148552 A1 | 6/2008 | Pentek et al. |
| 2008/0278861 A1 | 11/2008 | Jiang et al. |
| 2008/0297945 A1 * | 12/2008 | Han et al. .................... 360/125.3 |
| 2008/0313885 A1 | 12/2008 | Hsiao et al. |
| 2009/0002885 A1 * | 1/2009 | Sin ........................... 360/125.02 |
| 2009/0034128 A1 | 2/2009 | Sharma et al. |
| 2009/0116145 A1 | 5/2009 | Guan et al. |
| 2009/0128952 A1 | 5/2009 | Sato et al. |
| 2009/0168236 A1 * | 7/2009 | Jiang et al. ..................... 360/110 |
| 2009/0168242 A1 | 7/2009 | Liu |
| 2009/0184091 A1 | 7/2009 | Zheng |
| 2009/0195920 A1 | 8/2009 | Bonhote et al. |
| 2010/0155364 A1 | 6/2010 | Pentek et al. |
| 2011/0097601 A1 | 4/2011 | Bai et al. |
| 2011/0120878 A1 | 5/2011 | Hong et al. |
| 2011/0147222 A1 | 6/2011 | Pentek et al. |
| 2011/0228425 A1 | 9/2011 | Liu et al. |
| 2011/0255196 A1 | 10/2011 | Wu et al. |
| 2012/0140358 A1 | 6/2012 | Sasaki et al. |
| 2012/0147499 A1 | 6/2012 | Sasaki et al. |
| 2012/0147501 A1 | 6/2012 | Sasaki et al. |
| 2012/0304454 A1 | 12/2012 | Jiang et al. |

* cited by examiner

ABS Location

METHOD FOR PROVIDING A MONOLITHIC SHIELD FOR A MAGNETIC RECORDING TRANSDUCER

BACKGROUND

FIG. 1 is a flow chart depicting a conventional method 10 for fabricating for a conventional magnetic recording transducer including side shields. For simplicity, some steps are omitted. A leading edge shield is formed, via step 12. The leading edge shield is typically a magnetic material such as NiFe. A nonmagnetic layer, such as aluminum oxide, is also deposited, via step 14. A pole, such as a perpendicular magnetic recording (PMR) pole, is provided in the nonmagnetic layer, via step 12. For example, a damascene process that forms a trench in the aluminum oxide layer, deposits nonmagnetic side gap/seed layers, and deposits magnetic pole layers may be used. The portion of the magnetic material external to the trench may be removed, for example using a chemical mechanical planarization (CMP) process.

The exposed aluminum oxide around the pole is wet etched, via step 14. Thus, a trench is formed around a portion of the pole near the ABS location. Note that side gap layers may remain after the aluminum oxide etch in step 14. The removal of the aluminum oxide in step 14 exposes the top surface of the leading edge shield. The side shields are provided, via step 16. Step 16 may include depositing seed layers and plating the side shields. Processing may then be completed, via step 18. For example, a trailing edge shield and gap may be formed.

FIG. 2 depicts plan and air-bearing surface (ABS) views of a portion of a conventional transducer 50 formed using the conventional method 10. The conventional transducer 50 includes a leading edge shield 52, side shield 54, Ru side gap layer 56 which is deposited in the trench, a pole 58, top gap layer 60, and trailing shield 62. Thus, using the conventional method 10, the pole 58, side shields 54, and trailing shield 62 may be formed.

Although the conventional method 10 may provide the conventional transducer 50, there may be drawbacks. The performance of the conventional transducer 50 may be compromised. In particular, fabrication using the method 10 may result in defects 64 and 66. Defect 64 may be termed a black line defect, while defect 66 may be considered a dotted black line defect. The defects are believed to result from formation of a leading bevel in the pole 58. Additional cleaning of the side gap layer 56 may reduce the size of the defects 64 and 66. However, the defects are not removed. The conventional transducer may thus have adjacent track interference (ATI) issues and/or reliability issues. As a result, performance of the conventional transducer 50 may be compromised.

Accordingly, what is needed is an improved method for fabricating a transducer.

SUMMARY

A method fabricates a magnetic transducer having a nonmagnetic layer and an ABS location corresponding to an ABS. An etch stop layer and a sacrificial leading shield on the etch stop layer are provided. A nonmagnetic layer, a portion of which is on the sacrificial leading shield, is provided. A pole trench is formed in the nonmagnetic layer. The pole trench is on the sacrificial leading shield and has a shape and location corresponding to the pole. A pole having a pole tip region is formed. The pole has a bottom and a top wider than the bottom in the pole tip region. A portion of the pole in the pole tip region is in the pole trench and at the ABS location. A portion of the nonmagnetic layer adjacent to the pole and the sacrificial leading shield is removed. An air bridge thus resides in place of the sacrificial leading shield between the portion of the pole and the etch stop layer. At least one shield layer is provided. The shield layer(s) substantially fill the air bridge and form a monolithic shield including a leading shield and side shield(s).

DETAILED DESCRIPTION OF THE PREFERRED EMBODIMENTS

Figure 1:
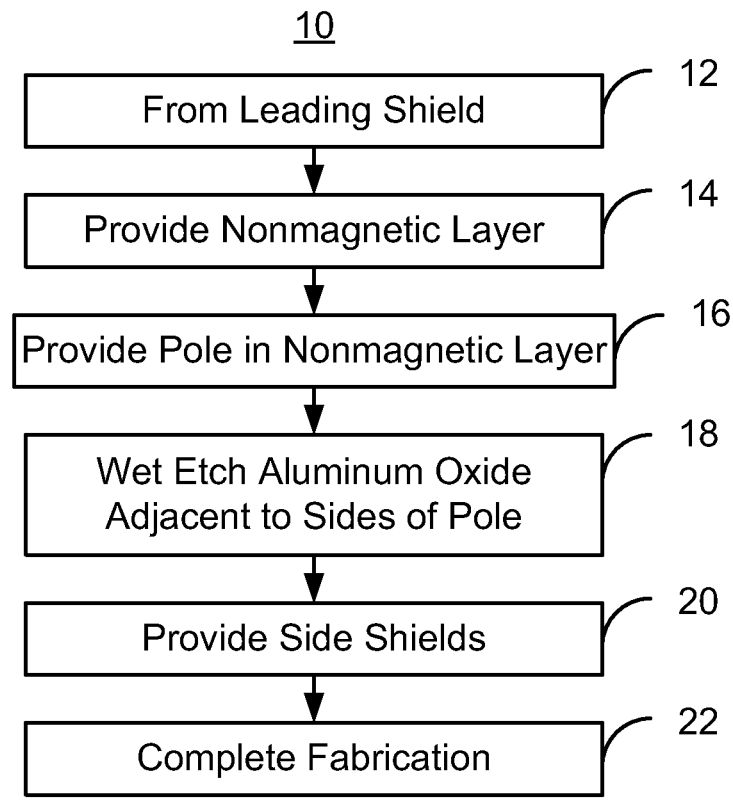
FIG. 1 is a flow chart depicting a conventional method for fabricating a magnetic recording transducer.
Figure 2:
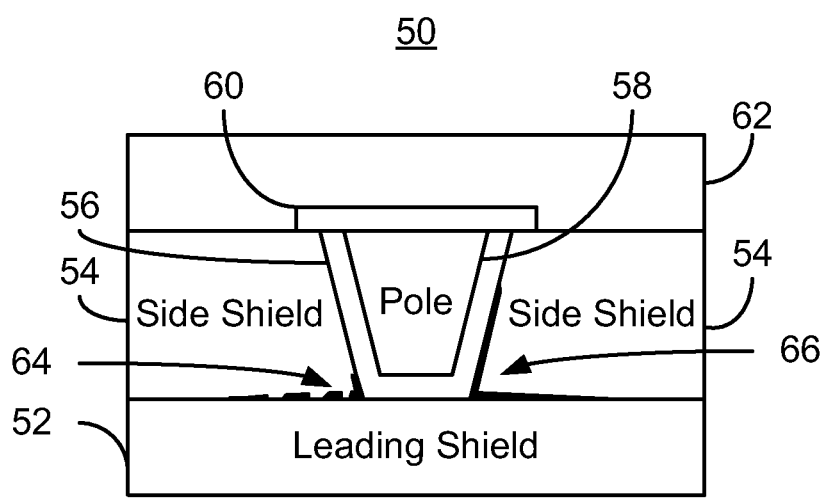
FIG. 2 is a diagram depicting an ABS view of a conventional magnetic transducer.
Figure 3:
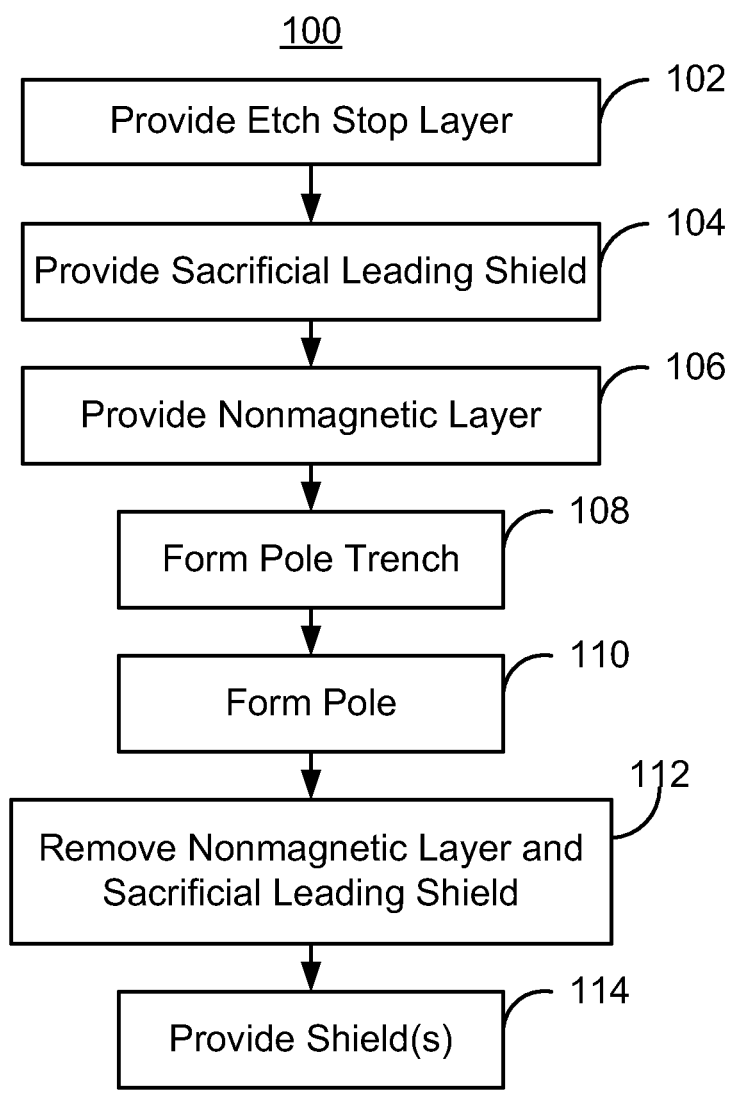
FIG. 3 is a flow chart depicting an exemplary embodiment of a method for fabricating a magnetic recording transducer including side shields.

FIG. 3 is a flow chart depicting an exemplary embodiment of a method 100 for fabricating a transducer. The method 100 is may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 also may commence after formation of other portions of the transducer. The method 100 is also described in the context of providing a single pole, a single monolithic shield and their associated structures in a single magnetic recording transducer. However, the method 100 may be used to fabricate multiple structures and/or multiple transducers at substantially the same time. The method 100 and system are also described in the context of particular layers. However, in some embodiments, such layers may include multiple sub-layers. The method 100 commences after formation of other portions of the transducer. Further, an air-bearing surface location (ABS location) marks the surface at which the air-bearing surface (ABS) will reside.

An etch stop layer is provided, via step 102. In some embodiments, step 102 includes depositing a single layer. However, in other embodiments, a multilayer is provided in step 102. For example, the etch stop layer may include one or more of a Ta/Ru layer, a Pt/Ru layer, a Ti/Ru layer, and a Ti/NiCr layer. In such embodiments, the first, bottom layer of Ta, Pt, or Ti may serve as an adhesion layer. The upper Ru or NiCr layer may act as a stop layer for an etch of the sacrificial leading shield, as described below. The etch stop layer may be provided in a trench in an underlayer. The underlayer might include materials such as aluminum oxide.

A sacrificial leading shield is provided, via step 104. The sacrificial leading shield may be a NiFe shield that is plated into the trench in an underlayer. The sacrificial leading shield thus resides on the etch stop layer. In some embodiments, the sacrificial leading shield may be configured such that a bottom, or leading edge, bevel is formed in the pole.

A nonmagnetic layer, such as aluminum oxide, is provided, via step 106. A portion of the aluminum oxide layer resides on the sacrificial leading shield. However, the nonmagnetic layer generally extends further than the sacrificial leading shield. In some embodiments, a stop layer analogous to the etch stop layer provided in step 102 is provided prior to the nonmagnetic layer being deposited.

A pole trench is formed in the nonmagnetic layer, via step 108. In some embodiments, step 108 is performed by providing a mask with an aperture of the desired footprint and location of the pole. The pole trench has the shape and location for the pole to be formed. Further, the pole trench is formed on the sacrificial leading shield. In some embodiments, the bottom of a portion of the pole trench is formed by the sacrificial leading shield.

A pole is formed, via step 110. Step 110 typically includes depositing seed and other layers as well as depositing high saturation magnetization materials for the pole. The seed layer may be nonmagnetic layer(s) that can be used to protect the pole during a wet etch, described below. Such seed layer(s) may also act as a side gap between the pole and the shields being formed. The nonmagnetic layer(s) may also be used to reduce the track width and/or height of the pole at the ABS. The seed layer may thus include materials such as Ru. In some embodiments, high saturation magnetization layers are plated as part of step 110. In some embodiments, the pole has a bottom and a top wider than the bottom in the pole tip region. A portion of the pole in the pole tip region is in the pole trench. In some embodiments, a hard mask is provided on the pole after fabrication is completed. In some such embodiments, the hard mask is conductive. For example, the hard mask may be a Ta/C/X/W multilayer, where X may be Ru and/or Cr. In such embodiments, the hard mask may be used as a seed layer for contact pads that reside in the field region.

A portion of the nonmagnetic layer adjacent to the pole and the sacrificial leading shield are removed, via step 112. One or more wet etches may be performed to remove the nonmagnetic layer and sacrificial leading shield. In one embodiment, the nonmagnetic layer is removed using a first, aluminum oxide wet etch, while the sacrificial leading shield is removed using a second, NiFe wet etch. In some embodiments, a first mask is used for the first aluminum oxide wet etch, while a different mask used in providing the shield layers, described below, is also used for the second, NiFe wet etch. However, in other embodiments, another number of masks may be used. Because of the presence of the stop layer(s), the wet etch does not completely remove the nonmagnetic layer or the underlying layers in which the sacrificial leading shield is formed. Because of the removal in step 112, an air bridge resides in place of the sacrificial leading shield, between part of the pole tip near the ABS and the etch stop layer. The pole is supported by the remaining portion of the pole. In some embodiments, the air bridge has a thickness of not more than one micron.

At least one shield layer is provided, via step 114. In some embodiments, step 114 includes depositing a side shield seed layer and plating material(s) for the shields. In some embodiments, NiFe is plated in step 114. The shield material(s) substantially fill the air bridge and form a monolithic shield. The monolithic shield includes a leading shield and at least one side shield. The leading shield may take the place of the sacrificial leading shield while the side shield(s) fill in the region in which the nonmagnetic layer has been removed. In some embodiments, the mask used in providing the shield exposes a portion of the field region on which contact pads are formed. In some such embodiments, the side shield mask used in plating the shield exposes a portion of the field region. In such an embodiment, the seed layer may also be used as a seed layer for plating of the pads later in fabrication of the transducer.

Figure 4:
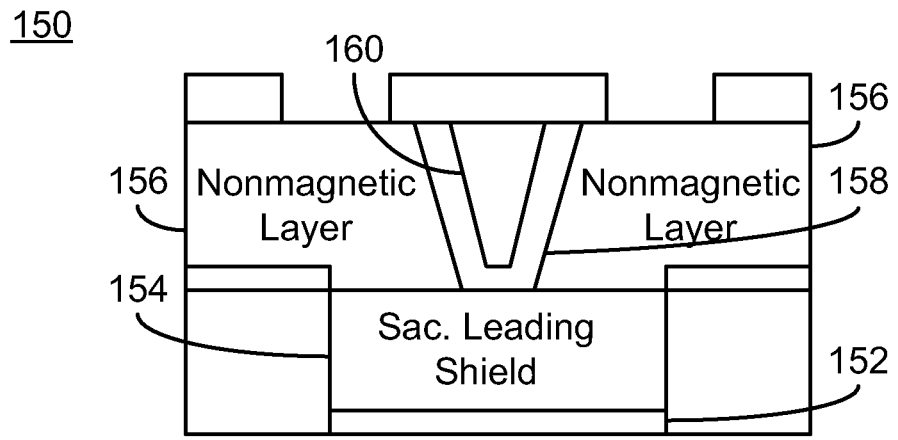
FIGS. 4-6 are diagrams depicting an exemplary embodiment of a magnetic transducer having side shields during fabrication.
Figure 5:
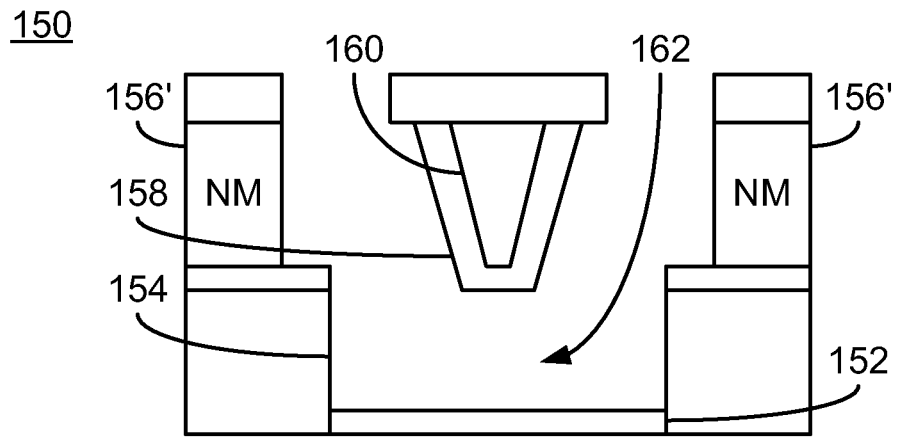
Figure 6:
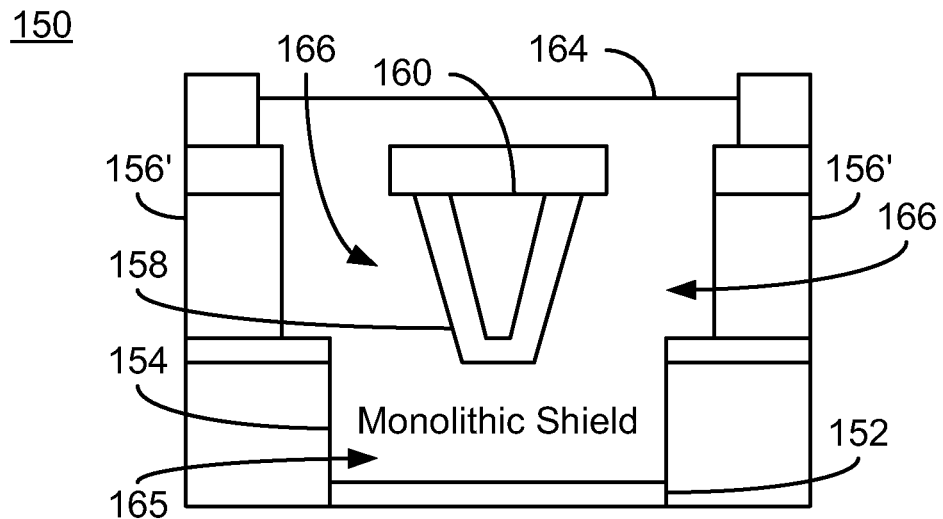

FIGS. 4-6 depict ABS views of a magnetic transducer 150 during formation using the method 100. For clarity, FIGS. 4-6 are not to scale. The magnetic transducer 150 may be part of a merged heat that includes at least one read transducer (not shown) in addition to at least one magnetic transducer 150. FIG. 4 depicts the transducer 150 after step 110 is performed. The magnetic transducer 150 includes an etch stop layer 152, a sacrificial leading shield 154, a nonmagnetic side shield layer 158, pole 160, and nonmagnetic layer 156.

FIG. 5 depicts the transducer 150 after step 112 has been performed. Thus, the sacrificial leading shield 154 and part of the nonmagnetic layer 156 have been removed. A portion 156' of the nonmagnetic layer remains. An air bridge 162 has been formed. The air bridge 162 exists between the bottom of the pole 160 and the etch stop layer 152. In some embodiments, the air bridge 156 may have a thickness of up to a micron. In other embodiments, the air bridge 156 may have a different thickness. Although not shown, the pole 160 may have an anchor portion (not shown in FIGS. 4-6) on the opposite side of the ABS location as the remainder of the pole. Thus, the pole 160 may be supported on both sides of the air bridge 162.

FIG. 6 depicts the magnetic transducer 150 after step 114 is performed. Thus, the monolithic shield 164 has been fabricated. The monolithic shield 164 may be considered to be formed of leading shield 165 and side shields 166.

Using the method 100, a monolithic shield 164 including a leading shield 165 and side shield(s) 166 having the desired geometry may be fabricated. More specifically, the monolithic shield 164 is continuous. Thus, there are no black line or dotted black line defects between the leading shield 165 and side shields 166 of the monolithic shield 164. This is because there is no interface between these portions. Instead, the shield 164 is monolithic. In addition, growth of the shield 165 during plating may start no only at the bottoms of the trench and air bridge 162, but also from nonmagnetic seed layers 158 for the shield 160. Consequently, the microstructure for the monolithic shield 164 may be improved. Moreover, the monolithic shield 164 may better shield the fringing field. Thus, signal to noise, adjacent track interference, and other characteristics may be improved. Thus, the transducer 150 may have superior performance.

Figure 7:
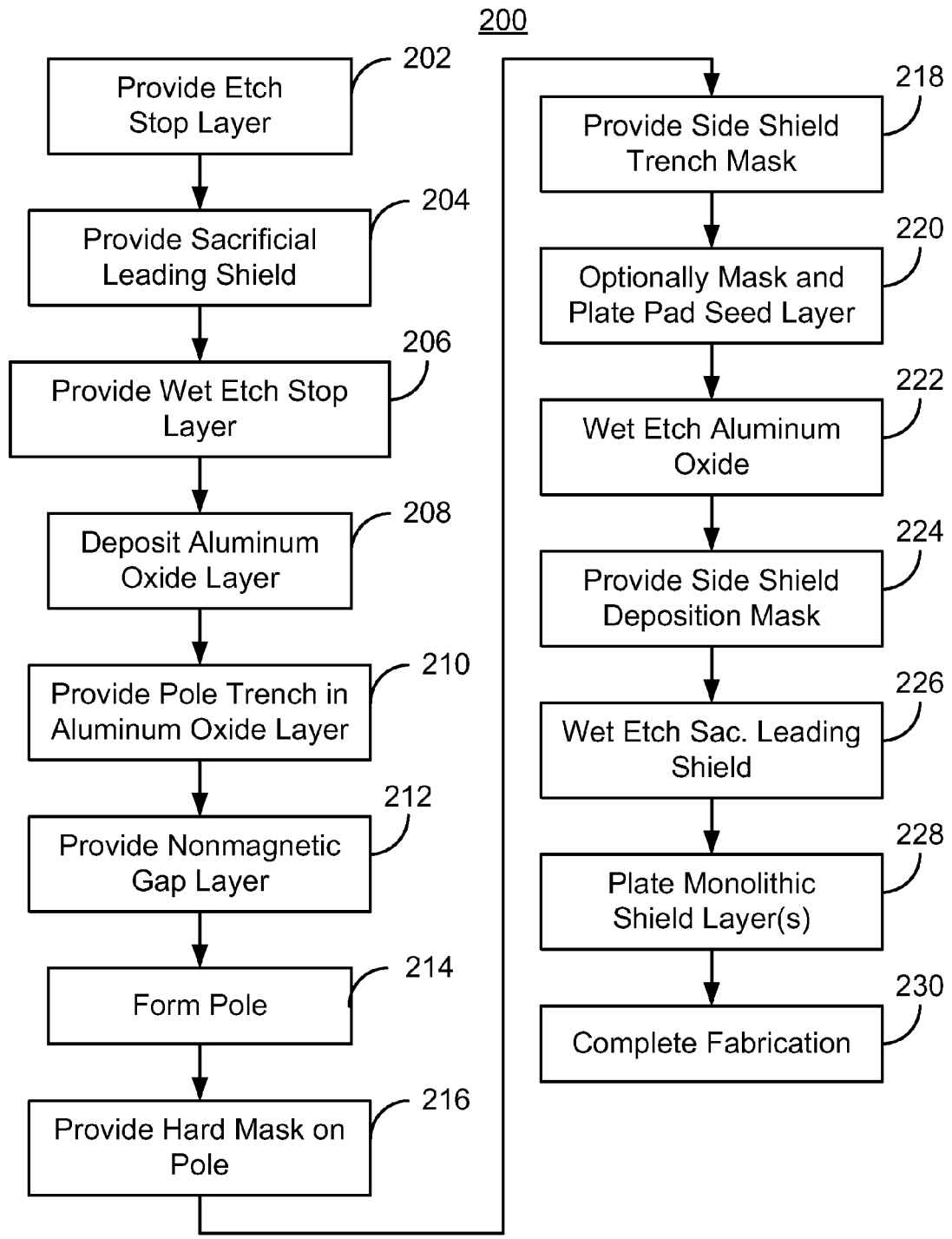
FIG. 7 is a flow chart depicting another exemplary embodiment of a method for fabricating side shields for a magnetic recording transducer.

FIG. 7 is a flow chart depicting another exemplary embodiment of a method 200 for fabricating a transducer having a monolithic shield. For simplicity, some steps may be omitted. FIGS. 8-24 are diagrams depicting various views of an exemplary embodiment of a portion of a transducer during 250 fabrication. For clarity, FIGS. 8-24 are not to scale. Although FIGS. 8-24 depict the ABS location (location at which the ABS is to be formed) and ABS at a particular point in the pole, other embodiments may have other locations for the ABS. Referring to FIGS. 7-24, the method 200 is described in the context of the transducer 250. However, the method 200 may be used to form another device (not shown). The transducer 250 being fabricated may be part of a merged head that also includes a read head (not shown in FIGS. 8-24) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

Figure 8:
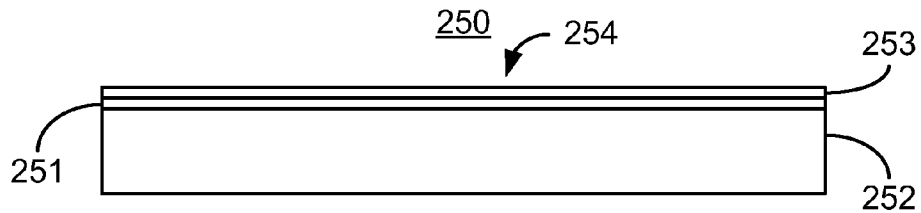
FIGS. 8-24 are diagrams depicting side, ABS, and plan views an exemplary embodiment of a magnetic recording transducer during fabrication.

An etch stop layer is provided, via step 202. The etch stop layer is desired to be resistant to an etch that removes the sacrificial leading shield, described below. In some embodiments, the etch stop layer is desired to be resistant to a NiFe wet etch. Step 202 may include forming a trench in a nonmagnetic layer, such as aluminum oxide, and depositing a Ta/Ru bilayer as the etch stop layer. In other embodiments, the etch stop layer may be Pt/Ru layer, a Ti/Ru layer, a Ti/NiCr layer or some other layer. In some embodiments, the etch stop layer is deposited as a full film. FIG. 8 depicts an exemplary embodiment the transducer 250 after step 202 is performed. Thus, an etch stop layer 254 is deposited on the nonmagnetic underlayer 252. In some embodiments, the magnetic underlayer 252 is an aluminum oxide layer.

Figure 9:
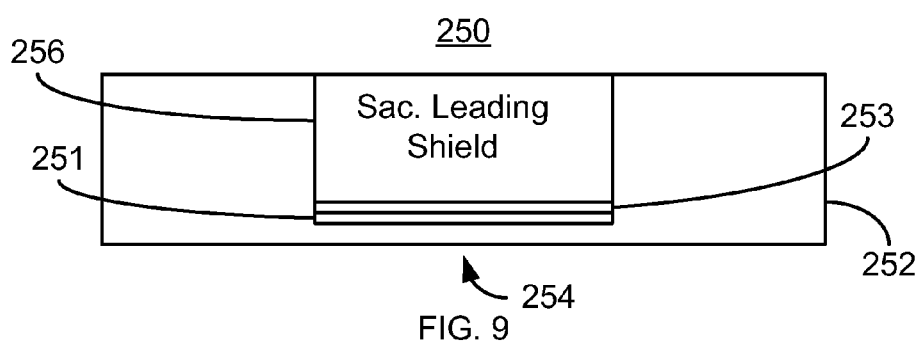
Figure 10:
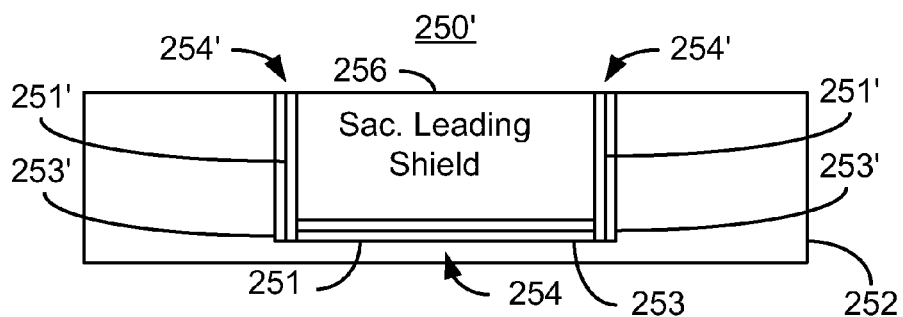
Figure 11:
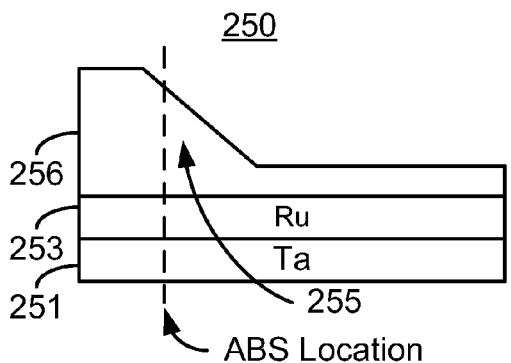
Figure 12:
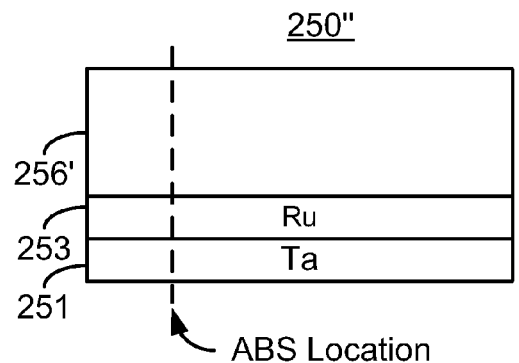

A sacrificial leading shield is provided, via step 204. In some embodiments, step 204 includes providing a photoresist mask having an aperture in the desired location of the sacrificial leading shield. A NiFe shield layer may be plated in the aperture to form the sacrificial leading shield. The photoresist mask may then be stripped and the exposed etch stop layer 254 removed. In some embodiments step 204 also includes forming an additional etch stop/seed layer on the sides of the sacrificial leading shield. A nonmagnetic layer, for example consisting of aluminum oxide, is also built up around the sacrificial leading shield. Because the nonmagnetic layer may be the same material as the underlayer 252, it is not separately labeled in the drawings. In some embodiments, the sacrificial leading shield has a beveled surface so that the pole being formed also has a beveled surface. However, in other embodiments the sacrificial leading shield may have another shape. For example, FIGS. 9-12 depict embodiments of the transducer 250, 250' and 250" after step 204 is performed. FIG. 9 is an ABS view of an exemplary embodiment of the transducer 250. Thus, sacrificial leading shield 256 has been formed, for example by plating NiFe on the etch stop layer 254. FIG. 10 depicts another exemplary embodiment of the transducer 250' in which an additional etch stop/seed layer 254' has been provided on the sides of the sacrificial leading shield 256. In some embodiments, the additional etch stop layer is the same as the layer 254 and so is depicted as including layers 251' and 253' in FIG. 10. FIGS. 11 and 12 depict side views of two embodiments of the transducer 250 and 250', respectively. In the embodiment shown in FIG. 11, the sacrificial leading shield 256 has a beveled surface. In other embodiments, the sacrificial leading shield 256 may be beveled only because the underlying topology has a beveled surface. FIG. 12 depicts an embodiment of the transducer 250' in which neither the sacrificial leading shield 256' nor the underlying topology has a beveled surface.

A wet etch stop layer is provided, via step 206. The wet etch stop layer is desired to be resistant to a wet etch of the layer formed in step 208, discussed below. For example, the wet etch stop layer may be resistant to an aluminum oxide wet etch. In some embodiments, the wet etch stop layer is a Ta/Ru bilayer similar to the etch stop layer provided in step 202. However, in other embodiments, other materials may be used. For example, the wet etch stop layer might be a Ta/Ru/Ta trilayer in which the top layer may be for adhesion of photoresist and may be removed.

Figure 13:
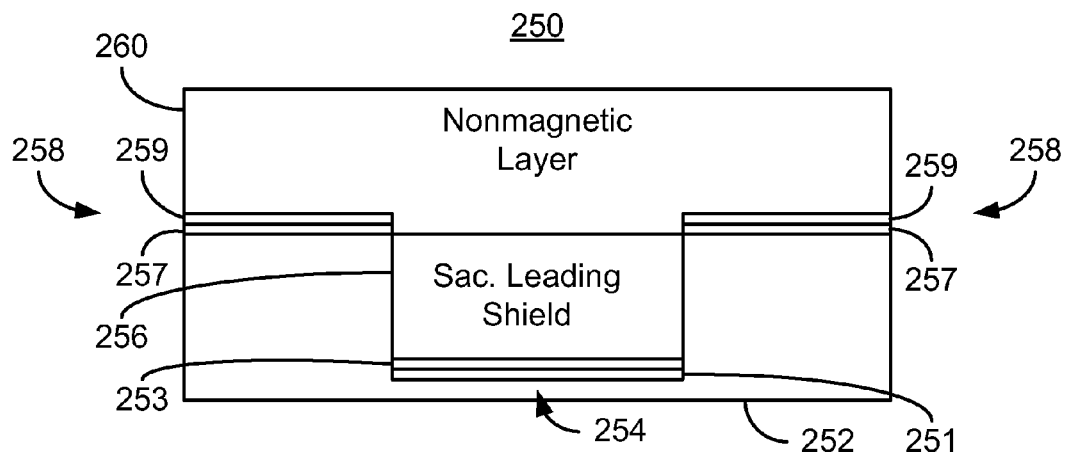

A nonmagnetic intermediate layer is provided, via step 208. In some embodiments, step 208 includes multiple substeps. For example, a nonmagnetic intermediate layer, such as aluminum oxide may be deposited. However, the deposition process may be conformal to the beveled surface 255. Without more, the top surface of the alumina may not be perpendicular to the ABS location. A planarization such as a CMP may be carried out so that the top surface of the nonmagnetic layer is perpendicular to the ABS. In some embodiments, an additional aluminum oxide layer is deposited. In other embodiments, a single aluminum oxide layer might be deposited. FIG. 13 depicts an ABS location view of an exemplary embodiment of the transducer 250 after step 208 is completed. Thus, the wet etch stop layer 258 and nonmagnetic layer 260 are shown. In some embodiments, the layer 258 includes a Ti layer 257 and a Ru layer 259. The nonmagnetic layer 260 is may include sublayers (not separately shown).

Figure 14:
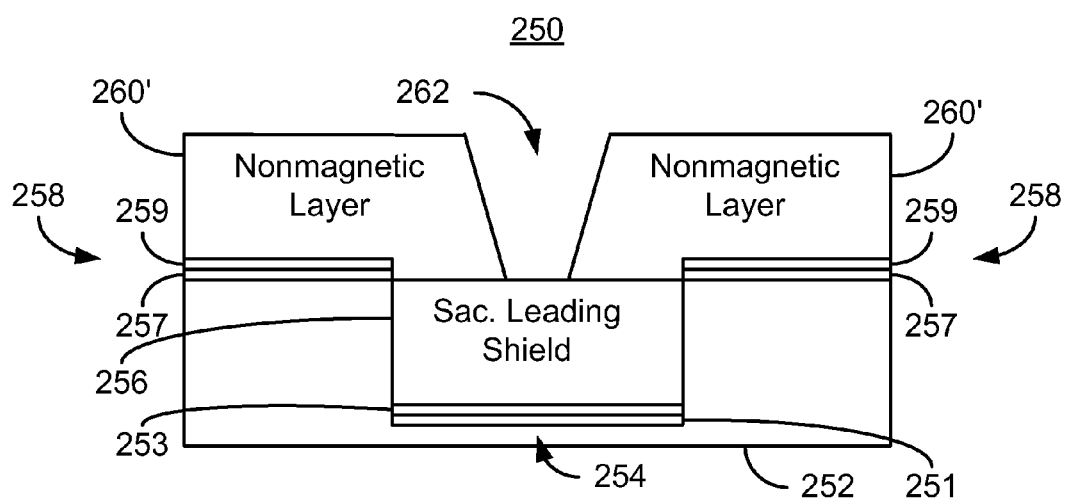

A pole trench is formed in the nonmagnetic layer 260, via step 210. Step 210 may include depositing hard mask layer(s) and providing a photoresist mask on the hard mask layers. The photoresist mask includes an aperture having a location and width corresponding to the desired trench. The underlying hard mask may then be etched, forming an aperture in the hard mask. The intermediate layer may then be etched in the region under the aperture in the hard mask. Thus, a pole trench having a bottom, a top wider than the bottom, and a location corresponding to a pole is formed. A portion of the bottom of the pole trench in a pole tip region proximate to the ABS location being formed by the beveled surface, if any, of the sacrificial leading shield 256. FIG. 14 depicts and ABS location view of an exemplary embodiment of the transducer 250 after step 210 is performed. Thus, pole trench 262 is shown in nonmagnetic layer 260'.

Figure 15:
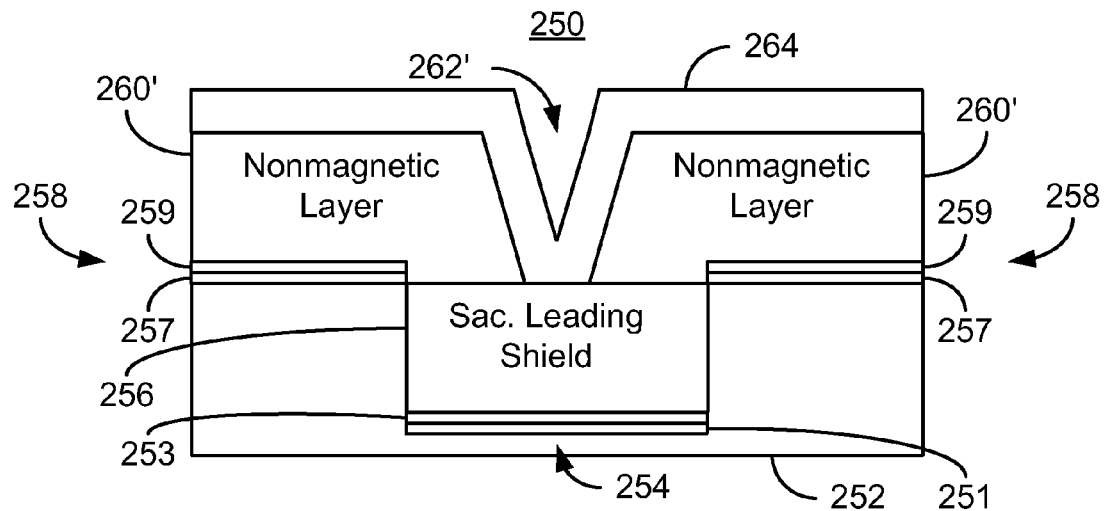

A nonmagnetic gap layer is provided, via step 212. The nonmagnetic gap layer may also function as a seed layer for the pole and/or a wet etch stop layer. In some embodiments, step 212 includes performing a CVD Ru deposition. FIG. 15 depicts an exemplary embodiment of the transducer 250 after step 212 is performed. Thus, Ru layer 264 has been formed. In the embodiment shown, a remaining portion of the trench 262' remains unfilled. In the embodiment shown, the trench 262' is triangular in shape because of the way in which the Ru layer 264 has been formed. However, in other embodiments, the trench 262' may have another shape.

Figure 16:
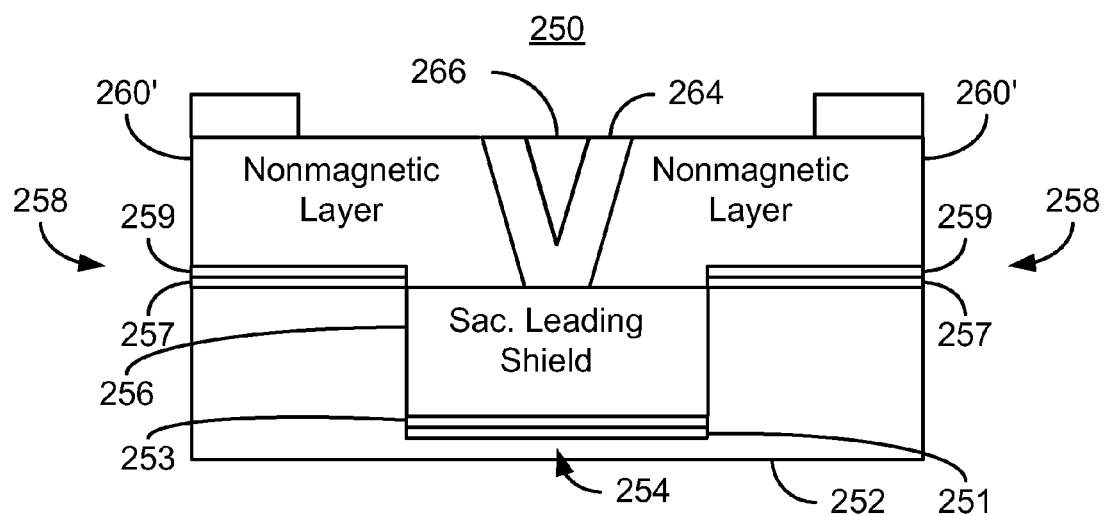

A pole is formed, via step 214. In some embodiments, the pole occupies only the pole trench 262'. In other embodiments, part of the pole formed in step 214 may be outside of the pole trench 262'. Step 214 includes plating high saturation magnetization pole material(s) such as CoFe. A planarization may also be performed. FIG. 16 depicts an ABS view of the transducer after step 214 is performed. Thus, the pole 266 is shown.

Figure 17:
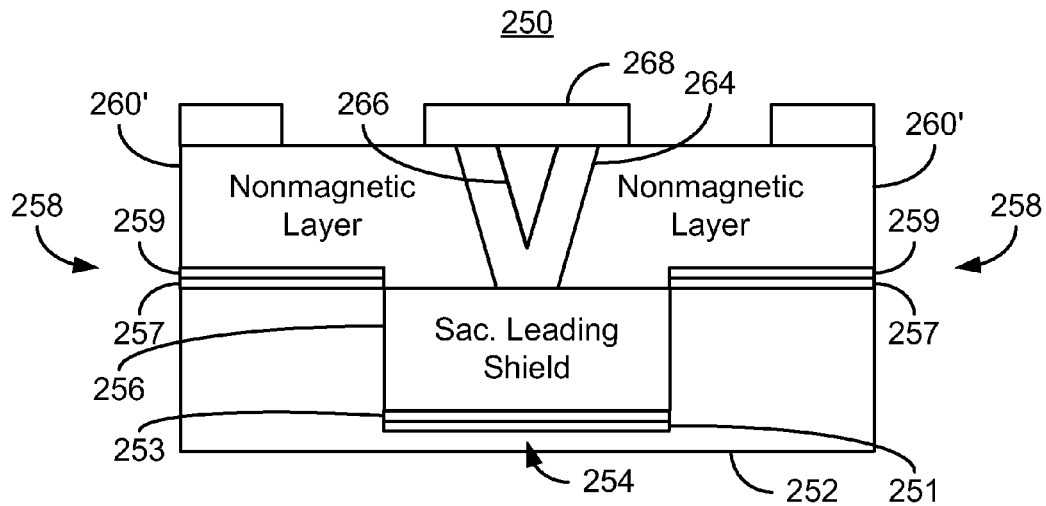

A hard mask is provided, via step 216. The hard mask is desired to be resistant to etches that remove the aluminum oxide nonmagnetic layer 260' and the sacrificial leading shield 256'. In some embodiments, step 216 includes a Ta/C/alumina/W multilayer. In such embodiments, the hard mask is insulating in large part because of the alumina layer. In other embodiments, the hard mask may be conductive. For example, a Ta/C/X/W multilayer, where X is Ru and/or Cr, may be used. If a conductive hard mask is used, then the mask(s) used in forming the hard mask may have apertures above regions of the field in which contacts are to be formed. In such embodiments, the conductive hard mask may be used as a seed layer for plating contacts. FIG. 17 depicts an ABS location view of an exemplary embodiment of the transducer 250 after step 216 is performed. Thus, a hard mask 268 has been formed on the pole 266. For simplicity, individual sublayers in the hard mask 268 are not shown. As can be seen in FIG. 17, a combination of the nonmagnetic side gap layer 264 and the hard mask 268 layer substantially surround the sidewalls, the bottom and top of the pole 266 in the pole tip region proximate to the ABS.

Figure 18:
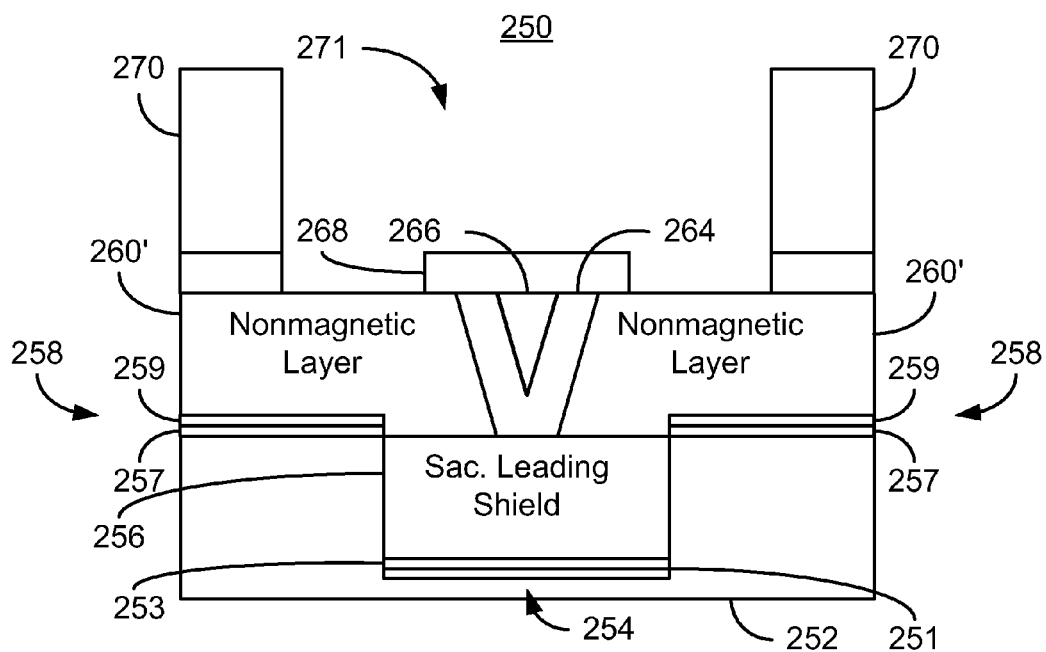

Steps 218, 220, 222 and 226 are used to form a trench for shields. A side shield trench mask is provided, via step 218. The side shield trench mask is generally a photoresist mask that exposes a portion of the device region. FIG. 18 depicts an exemplary embodiment of the transducer 250 after step 218 is performed. Thus, side shield trench mask 270 having aperture 271 is shown. The side shield trench mask is so termed because the mask is used in forming trenches in which side shields are to be formed.

Figure 19:
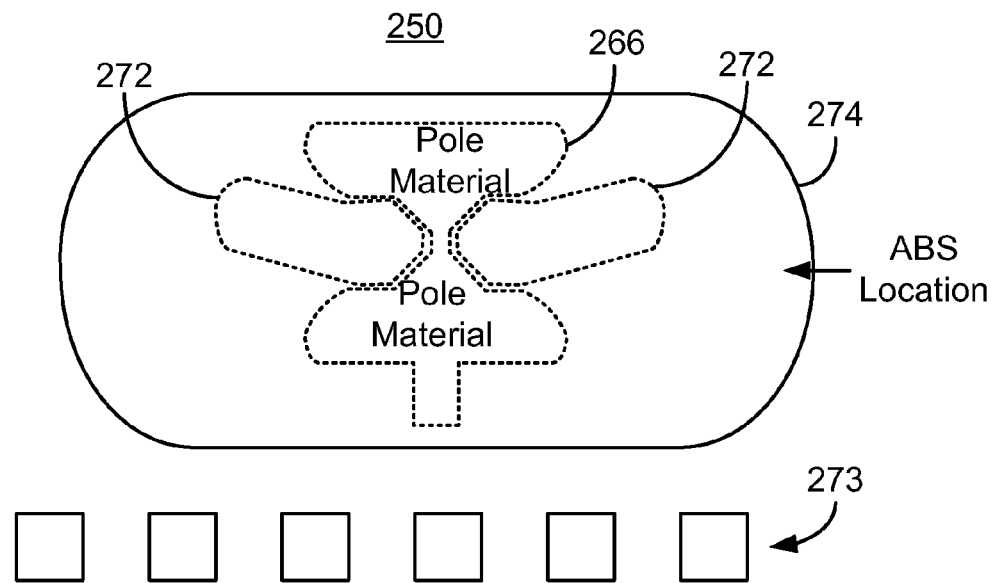

The contact pad seed layer may optionally be provided, via step 220. Step 220 may not be included if a conductive hard mask is provided in step 216 and used as a seed layer for contact pads. In step 220, the device region of the transducer 250 may be covered by a mask during deposition of the contact pad seed layer. The mask may be a bilayer PMGI/photoresist mask. However, in other embodiments another mask may be used. For example, FIG. 19 depicts a plan view of an exemplary embodiment of the transducer 250 during step 220. The locations of the contact pads 273 in the field region are shown. In addition, a mask that covers the device region is also present. Thus, the regions in which the pole 266 and side shield trenches 272 are fabricated are covered by the mask 274. Because these regions 272 and 266 are covered, they are shown by dashed lines in FIG. 19. Once the deposition of the contact pad seed layer is completed, the mask is stripped as part of step 220. Fabrication and stripping of the mask in step 220 is completed without adversely affecting the pole 266 and substantially completely removing the mask from the side shield trenches 272.

Figure 20:
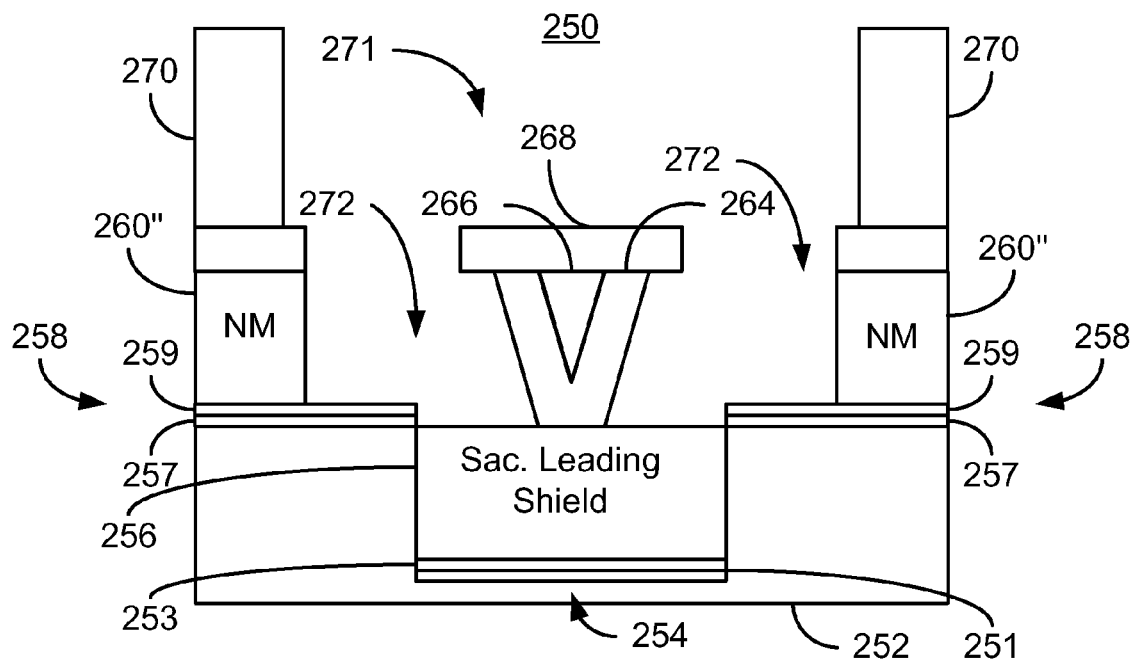

An aluminum oxide wet etch is performed, via step 222. The aluminum oxide wet etch removes exposed portions of the nonmagnetic layer 260". FIG. 20 depicts an exemplary embodiment of the transducer 250 after step 222 is completed. The wet etch stop layer 258 prevents the unwanted removal of additional portions of the transducer. A portion of the nonmagnetic layer 260' has been removed, leaving nonmagnetic layer 260" remaining. Side shield trenches 272 has been formed adjacent to the pole and, in the embodiment shown, adjoining the side gap layer 264. In the embodiment shown, the sacrificial leading shield 256 is not removed by the wet etch performed in step 220. However, in an embodiment in which both the nonmagnetic layer 260" and the sacrificial leading shield 256 may be removed by the same etch, a single etch may be used.

Figure 21:
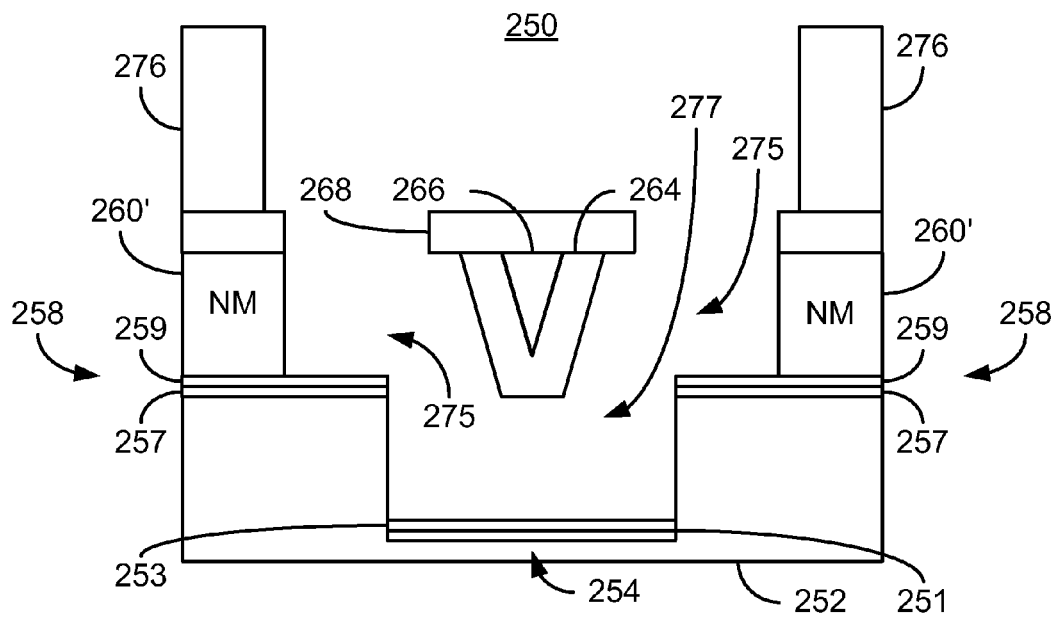
Figure 22:
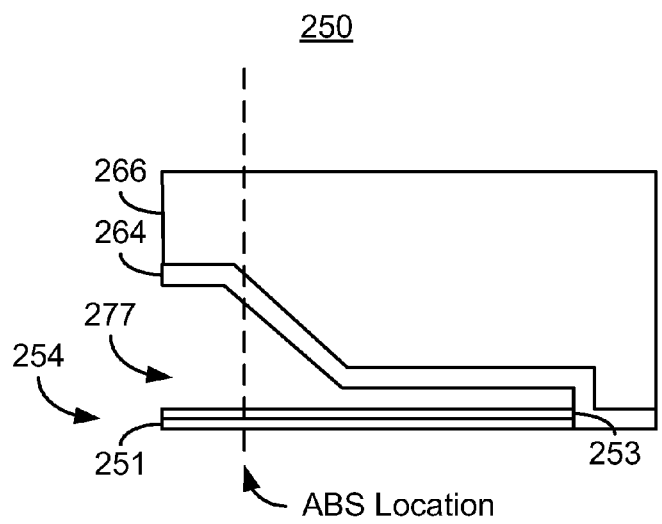

A side shield deposition mask is proved, via step 224. The side shield deposition mask exposes a region of the transducer 250 including part or all of the side shield trenches 272. In some embodiments, the mask provided in step 224 is a photoresist mask. The sacrificial leading shield 256 is removed, via step 226. In some embodiments, step 226 is performed using a wet etch appropriate for the material used in forming the sacrificial leading shield 256, such as a NiFe wet etch. The etch stop layer 254 prevents the wet etch of step 224 from removing additional portions of the transducer 250. FIGS. 21 and 22 depict ABS location and side views, respectively, of an exemplary embodiment of the transducer 250 after step 224 has been completed. The removal of the sacrificial leading shield has formed an air bridge 277 below the portion of the pole 266 at the ABS location. The air bridge 277 is between at least the etch stop layer 254 and the side gap layer 264 on which bottom of the pole tip portion of the pole 266 resides. Note, however, that the air bridge 277 extends only under a portion of the pole 266.

Figure 23:
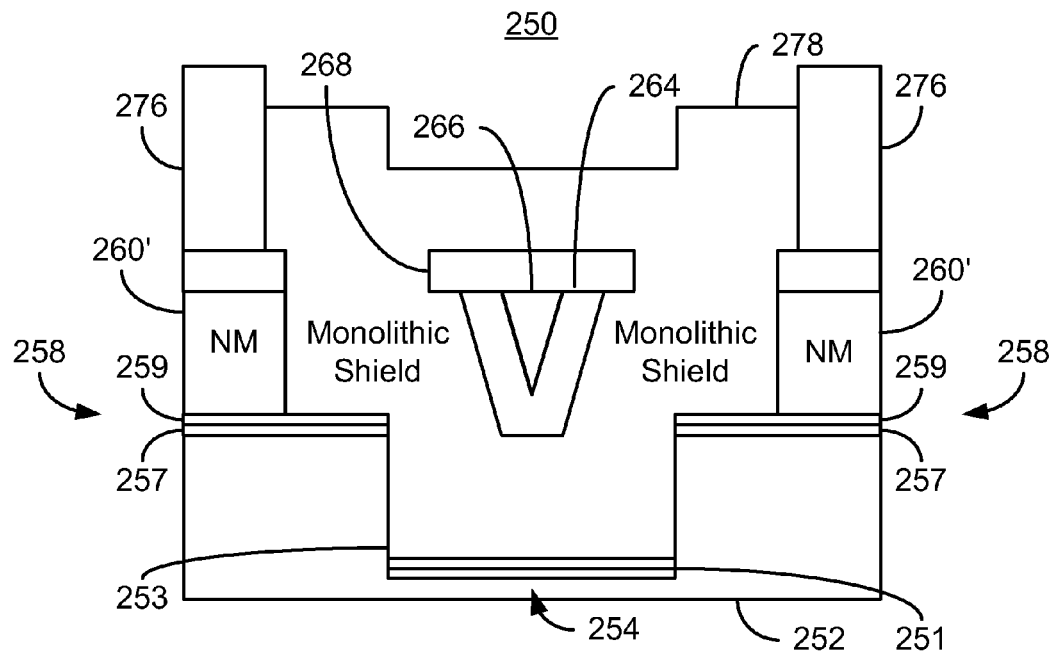

Material(s) for a monolithic shield are provided, via step 228. In some embodiments, step 228 includes plating a magnetic NiFe layer for the shield. In some embodiments, the layers 254 and 258 serve as plating seed layers. FIG. 23 depicts an ABS view of an exemplary embodiment of the transducer 250 after step 228 is performed. Thus, a monolithic shield layer 278 is shown. A portion of the monolithic shield 278 substantially fills the air bridge 277. The monolithic shield 278 may be considered to include a leading shield which resides between the pole 266 and etch stop layer 254 and side shields that are to the left and right of the pole 266 in FIG. 23.

Figure 24:
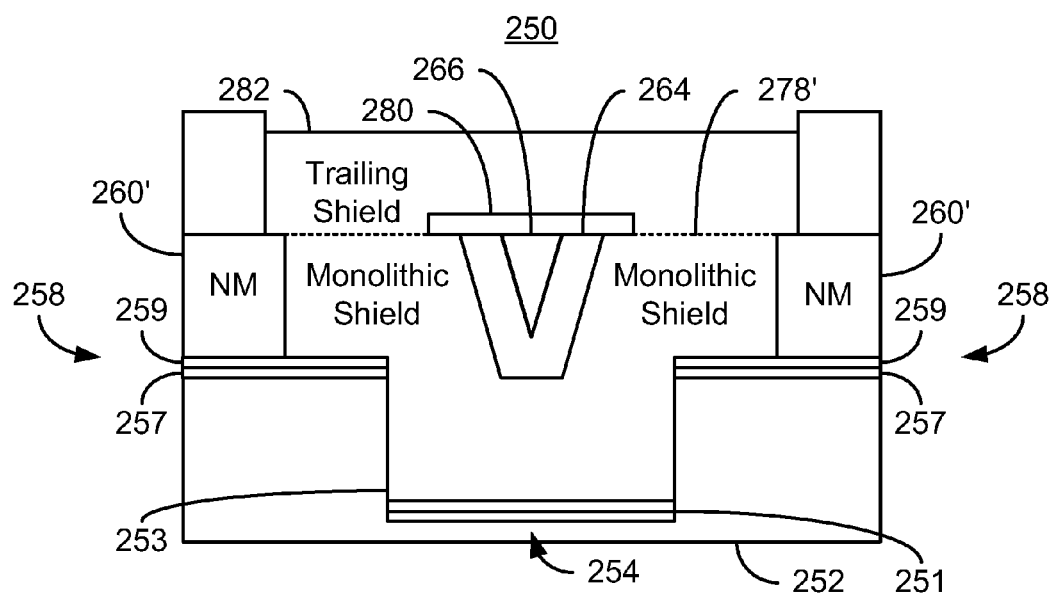

Fabrication of the transducer 250 is completed, via step 230. In some embodiments, the portion of the monolithic shield 278 above the pole 266 and the hard mask 268 are removed. In some such embodiments, a trailing edge bevel may be formed in the pole 266. A nonmagnetic write gap may also be formed. In addition, a trailing shield may be fabricated. Formation of the trailing shield may include plating an additional NiFe layer after the write gap has been formed. Further, other structures may also be fabricated. The transducer 250 may also be lapped to expose the ABS at the ABS location. FIG. 24 depicts an exemplary embodiment of the transducer 250 after step 230 is performed. Thus, monolithic shield 278' is shown. Also shown are write gap 280 and trailing shield 282. In the embodiment shown, the trailing shield 282 and monolithic shield 278' are physically and magnetically connected. However, in other embodiments, the write gap 280 may extend further, preventing or limiting contact between the trailing shield 282 and the monolithic shield 278'.

Thus, using the method 200, the transducer 250 may be fabricated. The transducer 250 shares the benefits of the transducer 150. A monolithic shield 278' that is continuous and interface free below the pole 266 may be formed. The presence of black line defects may be reduced or eliminated Thus, performance of the transducer 250 may be improved.

We claim:

1. A method for fabricating a magnetic transducer having an air-bearing surface location (ABS location) corresponding to an air-bearing surface (ABS), the method comprising:
   providing an etch stop layer;
   providing a sacrificial leading shield on the etch stop layer, the sacrificial leading shield having a beveled surface and including NiFe;
   providing a nonmagnetic layer, a portion of the nonmagnetic layer on the sacrificial leading shield;
   providing a pole trench in the nonmagnetic layer, the pole trench having a shape and location corresponding to the pole, the pole trench residing on the sacrificial leading shield;
   forming a pole having a pole tip region, the pole having a bottom and a top wider than the bottom in the pole tip region, a portion of the pole in the pole tip region residing in the pole trench and at the ABS location;
   removing a portion of the nonmagnetic layer adjacent to the pole and the sacrificial leading shield such that an air bridge resides in place of the sacrificial leading shield between the portion of the pole and the etch stop layer; and
   providing at least one shield layer, the at least one shield layer substantially filling the air bridge and forming a monolithic shield including a leading shield and at least one side shield.

2. The method of claim 1 wherein the etch stop layer includes at least one of a Ta/Ru layer, a Pt/Ru layer, a Ti/Ru layer, and a Ti/NiCr layer.

3. The method of claim 2 wherein the step of providing the nonmagnetic layer includes:
   providing a wet etch stop layer on at least the sacrificial leading shield; and
   depositing an aluminum oxide layer.

4. The method of claim 3 wherein the step of providing the pole trench further comprising:
   reactive ion etching the aluminum oxide layer.

5. The method of claim 1 wherein the step of providing the at least one shield further comprising:
   depositing a side shield seed layer; and
   plating the at least one shield.

6. The method of claim 5 wherein the side shield mask exposes a portion of a field region corresponding to at least one pad and at least one coil and wherein the shield seed layer further covers the portion of the field region.

7. The method of claim 5 wherein the side shield mask exposes a portion of a field region corresponding to at least one pad and at least one coil the method further comprising:
   providing a conductive hard mask, the conductive hard mask covering the pole and the portion of the field region.

8. The method of claim 1 wherein the air bridge had a thickness of not more than one micron.

9. A method for fabricating a magnetic transducer having an air-bearing surface location (ABS location) corresponding to an air-bearing surface (ABS), the method comprising:
   providing an etch stop layer;
   providing a sacrificial leading shield on the etch stop layer;
   providing a nonmagnetic layer, a portion of the nonmagnetic layer on the sacrificial leading shield;
   providing a pole trench in the nonmagnetic layer, the pole trench having a shape and location corresponding to the pole, the pole trench residing on the sacrificial leading shield;
   forming a pole having a pole tip region, the pole having a bottom and a top wider than the bottom in the pole tip region, a portion of the pole in the pole tip region residing in the pole trench and at the ABS location;
   removing a portion of the nonmagnetic layer adjacent to the pole and the sacrificial leading shield such that an air bridge resides in place of the sacrificial leading shield between the portion of the pole and the etch stop layer, the step of removing the portion of the nonmagnetic layer and the sacrificial leading shield further comprising:
      providing a side shield mask having an aperture therein, the aperture residing above the pole, the sacrificial leading shield, and the portion of the nonmagnetic layer; and
      performing a wet etch; and
   providing at least one shield layer, the at least one shield layer substantially filling the air bridge and forming a monolithic shield including a leading shield and at least one side shield.

* * * * *